United States Patent [19]

Brinkmann et al.

[11] Patent Number: 4,476,075
[45] Date of Patent: Oct. 9, 1984

[54] PROCESS AND APPARATUS FOR THE PRODUCTION OF SHEETING HAVING A COLOR WEDGE

[75] Inventors: Hans Brinkmann, Troisdorf; Horst Pabst, St. Augustin-Hangelar, both of Fed. Rep. of Germany

[73] Assignee: Dynamit Nobel Aktiengesellschaft, Troisdorf, Fed. Rep. of Germany

[21] Appl. No.: 405,405

[22] Filed: Aug. 5, 1982

[30] Foreign Application Priority Data

Aug. 18, 1981 [DE] Fed. Rep. of Germany ....... 3132509

[51] Int. Cl.$^3$ .............................................. B29F 3/10
[52] U.S. Cl. .................... 264/40.7; 264/75; 264/171; 264/245; 425/131.1; 425/376 A; 425/462
[58] Field of Search ................. 264/171, 245, 75, 40.7; 425/131.1, 133.5, 462, 376 A; 156/500

[56] References Cited

U.S. PATENT DOCUMENTS

| 1,952,469 | 3/1934 | Snyder et al. | 264/171 |
| 2,696,640 | 12/1954 | Wienand | 264/171 |
| 3,354,025 | 11/1967 | Aykanian et al. | 264/171 |
| 3,405,425 | 10/1968 | Buckley et al. | 264/171 |
| 3,471,898 | 10/1969 | Krystof | 425/131.1 |
| 3,608,013 | 9/1971 | Ingham | 425/132 |
| 3,715,420 | 2/1973 | Kiyono et al. | 264/171 |
| 3,849,051 | 11/1974 | Solbeck | 156/500 |
| 4,128,386 | 12/1978 | Wissinger et al. | 425/131.1 |
| 4,185,951 | 1/1980 | Wehermeier et al. | 425/133.5 |
| 4,316,868 | 2/1982 | Esposito et al. | 264/171 |
| 4,358,261 | 11/1982 | Ohki | 264/171 |
| 4,379,814 | 4/1983 | Tsien et al. | 264/171 |

FOREIGN PATENT DOCUMENTS

| 2035578 | 2/1971 | Fed. Rep. of Germany . | |
| 55-109643 | 8/1980 | Japan | 425/132 |
| 55-135642 | 10/1980 | Japan | 425/133.5 |
| 56-150515 | 11/1981 | Japan | 264/171 |

Primary Examiner—Jeffery Thurlow
Attorney, Agent, or Firm—Antonelli, Terry & Wands

[57] ABSTRACT

A slot die apparatus for the coextrusion of an endless sheet having a thickness of about 0.1–5 mm with an optionally dyed edge strip made from a narrower, optionally colored, melt stream of a width of about 100–500 mm and from a broader melt stream of a width of about 1,000–3,000 mm of a thermoplastic synthetic resin is provided by means of two parallel-operating extruders and associated melt pumps, with merging of the two melt streams. The apparatus is also provided by flanging together, by means of a flange, two dies at their end faces, these dies having identical cross sections and a corresponding width, comprising a spreader block, deckle, bottom lip, and top lip, and a flow channel made up from these components.

8 Claims, 8 Drawing Figures

PROCESS AND APPARATUS FOR THE PRODUCTION OF SHEETING HAVING A COLOR WEDGE

The invention relates to a process for the production of an endless sheeting with a color wedge from a thermoplastic synthetic resin comprising a colored edge strip, the color intensity of which passes over continuously into the undyed zone within a region of the color wedge adjoining the colored edge strip.

The invention furthermore concerns a slot die (e.g., a fishtail die, a flat sheeting die, etc.) for the coextrusion of an endless sheet having a thickness of about 0.1–5 mm with an optionally colored edge strip made from a narrower, optionally colored, melt stream of a width of about 100–500 mm and from a wider melt stream of a width of 1,000–3,000 mm of a thermoplastic synthetic resin, by means of two parallel-operating extruders and associated melt pumps, with merging of the two melt streams.

In a process and apparatus of a similar type (see German Pat. No. 2,035,578), a main stream of a molten thermoplastic synthetic resin, after spreading in the transverse direction of the sheet conveying direction, is forced through a slot die, and a stream of colored (dyed) synthetic resin is injected into this primary stream prior to exiting from the die at a point in time when the primary stream is still spreading in the transverse direction. The colored synthetic resin being supplied is then distributed in correspondence with the course of the flow lines at right angles to the conveying direction, attaining a color intensity which is strongest in the zone aligned with the site of injection of the colored synthetic resin, and which decreases toward the outside.

According to the invention, a different direction is taken; namely, by providing coextrusion from two flanged-together dies of the same geometric size in cross section, each of these dies being supplied by a colorless melt stream and by a dyed melt stream through two extruder systems. Thereby, a simple possibility is opened up at the same time for correspondingly widening a slot die for the extrusion of an endless sheet by an end-face flanging together of two dies of identical cross section, for the extrusion of wider sheeting.

The die component which is to extrude the broader melt stream, is positioned to the left of the component shown in FIG. 2 with the exception that it provides a wider die opening.

The color wedge is produced by an injector means including a probe which, by way of a separate bypass conduit and an injection nozzle, injects colored composition in a wedge shape into the die processing the colorless melt.

Sheeting on the basis of polyvinyl butyral, as well as sheeting of this type provided with a colored strip and an adjoining so-called color wedge serve as an interlayer in the production of safety glass, especially for automobile windshields and the like for glare reduction and protection from excessively bright light in the upper portion of the windshield.

It is an object of the invention to produce a reproducible color wedge, which can be exactly predetermined with regard to its confines, in an endless sheet of a thermoplastic synthetic resin, with a dyed (colored) strip.

According to the invention, this object, in a process of the above-described type, has been attained by injecting into a die composed of two parts of identical cross section (1) a stream of undyed melt having a width of about 1,000–3,000 mm and (2) a stream of dyed (colored) melt having a width of about 100–500 mm as well as (3) a partial stream having a quantity Y of dyed melt and a partial stream having a quantity (X-Y) of undyed melt in a width, starting from the parting line between dyed and undyed melt, of about 10–100 mm, preferably 15–60 mm, into the die part for the undyed melt with a continuously decreasing proportion Y of the dyed melt with respect to the undyed melt X by means of a probe lying in the transverse direction to the flow direction of the melt and exhibiting a groove terminating (or phasing out) in cross section; and coextrusion with merging of the undyed melt stream with the dyed melt stream in the zone of the color wedge in such a way that, in sheet cross section, an overlapping line extending obliquely at an ascension angle $\alpha$ of about 5°–30° with respect to the horizontal separates the undyed sheet material from the dyed sheet material.

In this connection, the procedure is such that, for producing the color wedge, the dyed melt is injected on the sheet side upstream of the deckle (or baffle bar) via a bypass conduit, injection nozzle, and probe, and the melt stream is throttled by constricting the flow channel for the undyed melt to such an extent that it is replaced by the dyed melt without an increase in flow velocity. The extension of the color wedge is determined by exchangeable probes having a length between about 10 and 100 mm.

The process of this invention is especially well suited for the manufacture of sheeting based on polyvinyl butyral (PVB) or also cellulose acetate.

In the apparatus of the above-indicated type, an endless sheet with color wedge is manufactured in a die having a spreader block, a deckel (baffle bar), bottom lip, and top lip and a flow channel formed from these parts, with the aid of a probe lying in its longitudinal dimension at right angles to the flow direction of the melt, this probe being supplied by a bypass between the flange and, on the sheet side, upstream of the deckle of the die for the colored edge strip, comprising a feed means for dyed melt terminating through the deckle into the probe, the probe projecting to an extent of between about 10 mm and 100 mm into the flow chanel of the broader die for the undyed melt. The probe has a groove extending in the longitudinal direction, which groove is open at the top and gradually ends, starting with the dyed edge strip, in the direction toward the center of the sheet, and which groove is intended for accommodating the dyed melt. To correct the thickness of the sheeting, the die has an adjustable, flexibile lip in the region of the probe, with the feed means to the probe fed by the bypass for dyed melt.

The pressure regulation for the bypass takes place suitably via a geared pump with a separate drive unit or via an adjustable throttle valve.

The principle of the apparatus of this invention resides essentially in flanging together, at their end faces, two slot dies for differing widths with geometrically identical cross section, wherein the larger die is fed with colorless melt and the smaller die is fed with colored melt by way of a second extruder system. To produce the color wedge, an injection nozzle with a probe is installed in the smaller die; by way of this nozzle, colored PVB composition is injected laterally into the larger die via a bypass conduit, which latter can be throttled separately.

The probe, having a wedge-like shape and projecting to differing extents into the larger die part, depending on the length of the color wedge, performs two functions:

(a) wedge-like demarcation or blanking off of the colorless melt stream;

(b) production of the color wedge.

By means of the color wedge, both mass streams are additonally fused together. The probe is exchangeable for the various lengths of the color wedge, lying between 10 and 100 mm, preferably between 15 and 60 mm.

The invention realizes the advantage that the undyed zone and the dyed zone of the sheet in the region of the color wedge can be predetermined with geometrical exactness by the geometry of the probe and by the injected quantity of dyed melt by means of the injection nozzle and the probe. Since, for reasons of process technique, there is the necessity for injecting the colored composition, as seen with respect to the sheet, upstream of the deckle in order to produce the wedge, the slot die must have a flexible lip in this region so that thickness correction can take place in the wedge zone.

With smaller widths of the dyed zone of the sheet, or with a smaller total width desired for the sheet, it is possible to throttle the slot dies in each case to the desired extent by aluminum inserts.

The dyed melt is supplied by the bypass conduit into the groove of the wedge-like probe thereby providing a flow of dyed melt which gradually becomes smaller and is zero at the end of the probe. Simultaneously the colorless melt stream is blanked off by the wedge-like probe with zero flow of colorless melt stream at the location of maximum flow of dyed melt through the probe in the sheet-conveying direction and gradually increasing flow of colorless melt at the locations of diminishing flow of dyed melt through the probe, thereby generating the color-wedge with ascension angle $\alpha$.

The probe can be square or of a streamlined shape in cross section with semicylindrical groove.

In order to regulate the sheet thickness which in the location of the color-wedge zone is made up from the thickness of the undyed sheet part and of the dyed sheet part, the thicknesses of the undyed sheet part and of the dyed sheet part, including the color wedge zone, are compared with each other and, by way of a computer, the feed means for the colored melt and the supply to the bypass are controlled correspondingly.

The invention will be explained in greater detail with reference to the accompanying drawings wherein.

Figure 1:
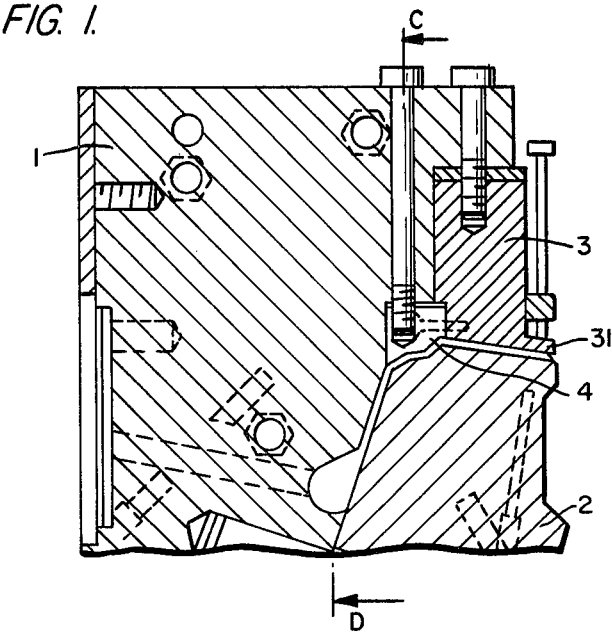
FIG. 1 shows a cross-section through a part of the slot die apparatus of the invention.
Figure 2:
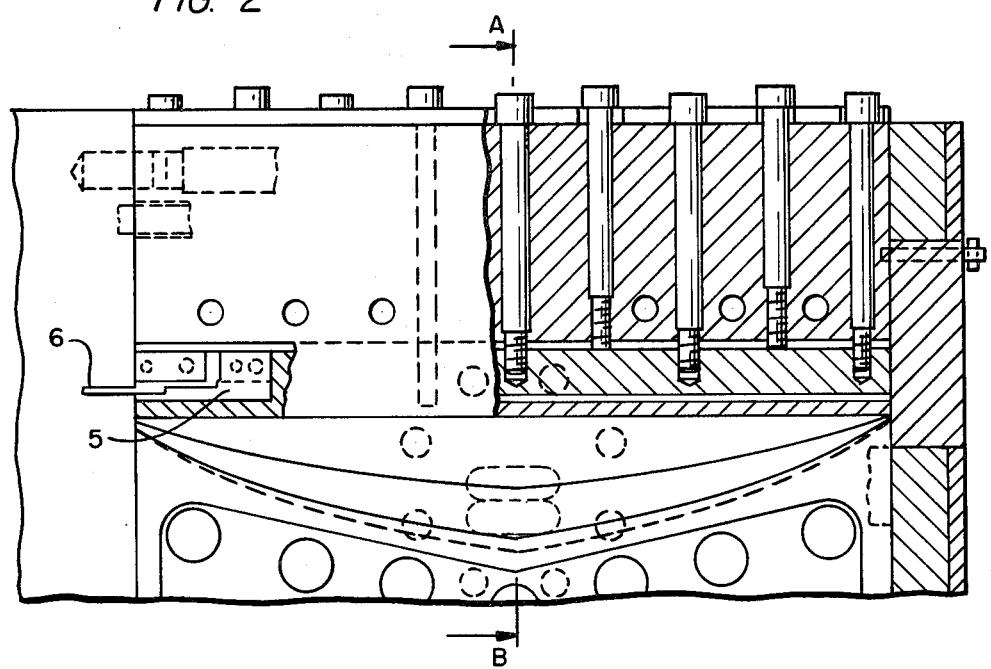
FIG. 2 shows a cross-sectional view taken along line C-D of FIG. 1 of the die slot apparatus.
Figure 3A:
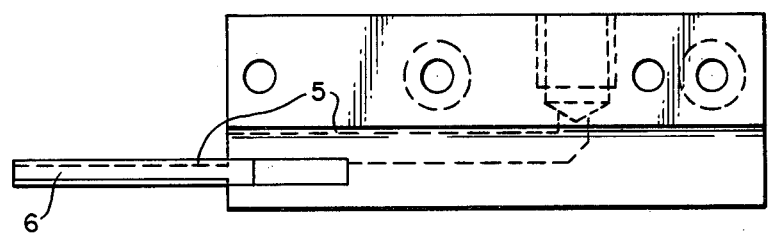
Figure 3B:
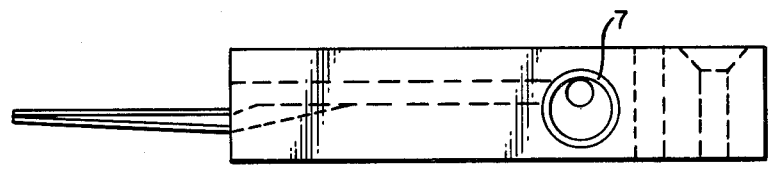
Figure 3C:
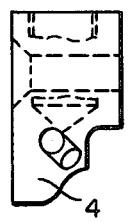
Figure 4:
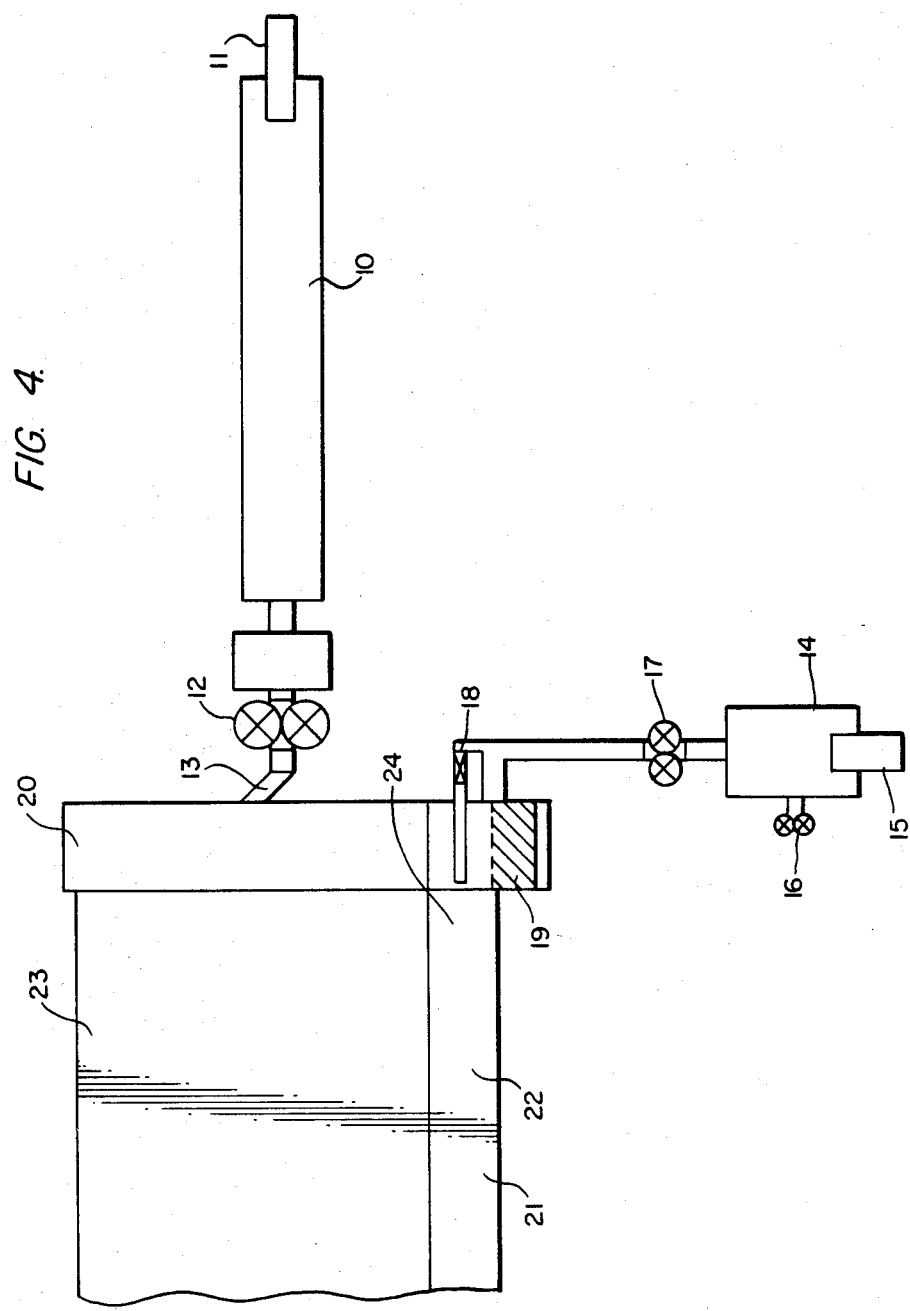
Figure 5:
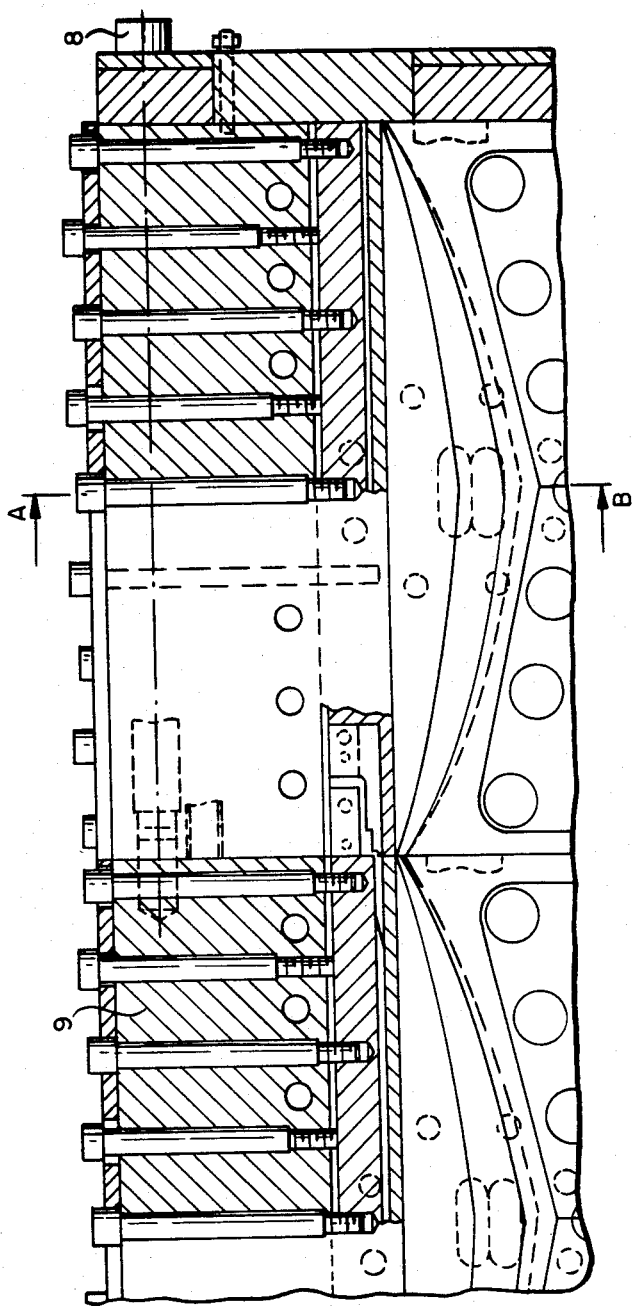
Figure 6:
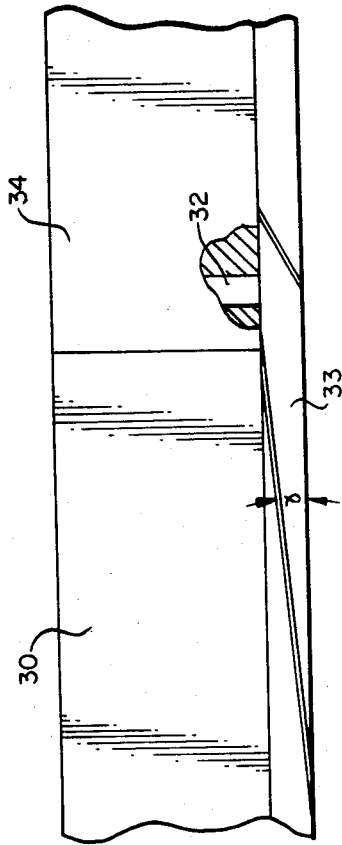

FIG. 3a, FIG. 3b and FIG. 3c, respectively, show front, top and side views of the deckle or restrictor bar, including an injection nozzle and probe for introducing colored melt for forming a color wedge;

FIG. 4 shows a schematic elevational view of an installation for the manufacture of color-wedge sheeting from polyvinyl butyral;

FIG. 5 shows a cross-sectional view taken along lines C-D of FIG. 1 with a die component as shown in FIG. 2; and FIG. 6 shows an enlarged, partial sectional view of the color-wedge and the probe of the die slot apparatus of the invention.

FIG. 1 of the drawing shows a section A-B through a slot die of this invention with a spreader block 1, bottom lip 2, top lip 3, flexible rib 31 with setscrew, and deckle 4. These parts form the flow channel for the melt of the thermoplastic synthetic resin. Tension bolts (screws) and pressure bolts (screws) extend through the spreader block in the plane C-D and act on the deckle and the top lip of the die for thickness correction of the sheet.

FIG. 2 shows the slot die illustrated in FIG. 1 in a section view C-D. Part 5 represents the injection nozzle with the probe 6 for the injection of colored synthetic resin composition into the undyed stream of the synthetic resin melt in the zone of the flange between the two die components joined by end-face flanging. FIG. 2 shows the die component through which the dyed synthetic resin melt is extruded over the entire width of the die component. The figure illustrates the position and installation of the injection nozzle 5 with probe 6.

FIG. 3 shows the injection nozzle 5 with the bypass conduit 7 and the connecting duct for the dyed melt, leading through the deckle 4 to the probe 6, in the three views, exhibiting front (FIG. 3a), top (FIG. 3b) and side view (FIG. 3c) of the deckle and the probe.

FIG. 4 shows a schematic view of a totally assembled unit for the production of color-wedge sheeting from polyvinyl butyral. The extruders 10 and 14 are supplied with polyvinyl butyral by way of weigh belt feeders 11 and 15. Extruder 14 is supplied with coloring component by way of feeder pump 16. Valve 18, which can also be a geared pump, controls the amount of bypass dyed resin, which is fed into the probe. Any produced waste and marginal strips are cut up, the resultant quantity is fed back into the associated extruder via respectively one weigh feeder. By way of the geared pumps 12 and 17, the undyed melt is fed via coupling element 13 into the die component 20, and the dyed melt is fed via a primary conduit and a bypass conduit controlled by a geared pump to the die component 24. The width of the fully dyed part 21 of the color wedge sheet 23 varies in dependence on the usages, and this also applies to the width of the undyed part of the color wedge sheet 23. The desired widths are demarcated in one or optionally both dies by aluminum inserts 19. The breadth of the color wedge 22 is determined by the length of the probe 6. The width of the sheet zone 22 with color wedge and the color gradient running from the fully dyed part 21 of the sheet to the undyed part of the color wedge sheet can be varied by the geometric shape and the dimensions of the preferably wedge-shaped probe 6 and by the depth and slope of the groove gradually terminating toward the end of the probe.

FIG. 5 shows the slot die illustrated in FIG. 1 in a section view C-D with the die component as shown in FIG. 2 and end-face flanged by tension bolts (screws) 8 to it the die component 9 which is to extrude the broader melt stream. FIG. 6 illustrates, how the color-wedge with the ascension angle $\alpha$ in the color-wedge sheet is generated and shows in more detail in a cross section the probe 33 with a wedge-like shape and an ascension angle $\alpha$, bypass conduit 32 supplying the probe with colored melt, deckle 34 for dyed melt and deckle 30 for undyed melt.

What is claimed is:

1. A process for the production of an endless color wedge sheet from a thermoplastic synthetic resin with a colored edge strip, the color intensity of which passes over continuously into an undyed zone, in a region adjoining the colored edge strip, which comprises injecting, into a die composed of two parts of identical cross section, (1) a stream of undyed melt having a predetermined width and (2) a stream of dyed melt having a width narrower than the stream (1), as well as (3) a partial stream having a quantity Y of dyed melt and a partial stream having a quantity (X-Y) of undyed melt, in a width, starting from the parting line between dyed melt and undyed melt, less than the width of the stream of the dyed melt, into the die part for the undyed melt with a continuously decreasing proportion Y of the dyed melt with respect to the undyed melt X, by means of a probe lying in the transverse direction to the flow direction of the melt and exhibiting a groove gradually ending in cross section; effecting coextrusion with merging of the undyed melt stream with the dyed melt stream in the zone of the color wedge whereby, in sheet cross section, an overlapping line, extending obliquely at an ascension angle $\alpha$ of about 5°-30° with respect to the horizontal, separates the undyed sheet material from the dyed sheet material.

2. A process according to claim 1, characterized in that, for producing the color wedge, the dyed melt is injected on the sheet side upstream of a deckle bar, and the melt stream is throttled by constricting the flow channel for the undyed melt to such an extent that it is replaced by the dyed melt, without increase in flow velocity.

3. A process according to one of claims 1 or 2, characterized in that, for regulating the sheet thickness, the thicknesses of the undyed sheet part and of the dyed sheet part, including the color wedge zone, are compared with each other and, by way of a computer, the feed means for the colored melt and the supply to the bypass are controlled correspondingly.

4. A process for producing a color wedge sheet according to claim 1, characterized in that the resin consists essentially of polyvinyl butyral or cellulose acetate.

5. A slot die apparatus for coextrusion of a partially colored endless thermoplastic sheet having an undyed edge portion, a dyed color-wedge and a dyed edge portion which comprises a feed port for the introduction of an undyed melt of a thermoplastic synthetic resin, a feed port for the introduction of a dyed melt of a thermoplastic synthetic resin, a distributing flow channel including a deckle bar, bypass means for diverting a portion of the dyed melt from the feed port, and means for defining an outlet nozzle in communication with the distributing flow channel for extruding the partially colored sheet; said means defining the flow channel comprising two die slot elements connected together in side-by-side adjacent relationship which are geometrically identical in longitudinal cross-section and vertical cross-section, one of said die elements effecting the extrusion of the dyed melt and the other of the die slot elements effecting extrusion of the undyed melt, the one die slot element in a zone immediately adjacent to the other die slot element having an injection feed port fed by said bypass means with a portion of said dyed melt, an injection nozzle arranged downstream of the injection feed port, said nozzle extending perpendicular to the extrusion direction of the melt into a portion of the flow channel containing the undyed melt from a parting line extending between the one die slot element and the other die slot element; said injection nozzle having a longitudinal section in a wedge-shape with a wedge angle of about 5°-30° for the formation of the color-wedge of the sheet.

6. A slot die apparatus according to claim 5, wherein the injection nozzle is equipped with the probe projecting at a right angle to the extrusion direction into the flow channel of the other slot die element for the undyed main stream of thermoplastic melt; said probe comprising an upwardly open groove extending in its longitudinal direction from a dyed portion of the sheet in the direction toward an undyed portion of the sheet.

7. A slot die apparatus according to claim 5, wherein the bypass means includes means for pressure-regulating the dyed melt introduced into said injection nozzle.

8. A process for the production of a thermoplastic sheet having a color-wedge strip with differing color intensity, which comprises extruding a main stream of a molten undyed thermoplastic synthetic resin through a die slot with a distributing flow channel, a deckle bar, and a outlet nozzle; injecting a melt stream of dyed synthetic resin into said main stream to form said color-wedge strip, the dyed melt stream for the color-wedge strip being injected in the extrusion direction upstream of the deckle bar; and throttling the undyed main stream of molten thermoplastic synthetic resin by constricting the flow channel to such an extent that a portion of the undyed main stream is replaced by the dyed melt stream without an increase in flow velocity of the molten thermoplastic synthetic resin.

* * * * *